T. WALSH.
CLUTCH.
APPLICATION FILED JUNE 23, 1919.

1,375,191. Patented Apr. 19, 1921.
4 SHEETS—SHEET 2.

Witnesses:
R. H. Pambel
Augustus B. Copper

Inventor
Timothy Walsh,
By Joshua R. H. Potts
his Attorney

T. WALSH.
CLUTCH.
APPLICATION FILED JUNE 23, 1919.

1,375,191.

Patented Apr. 19, 1921.
4 SHEETS—SHEET 3.

Witnesses:

Inventor
Timothy Walsh,
By Joshua R. H. Potts
his Attorney

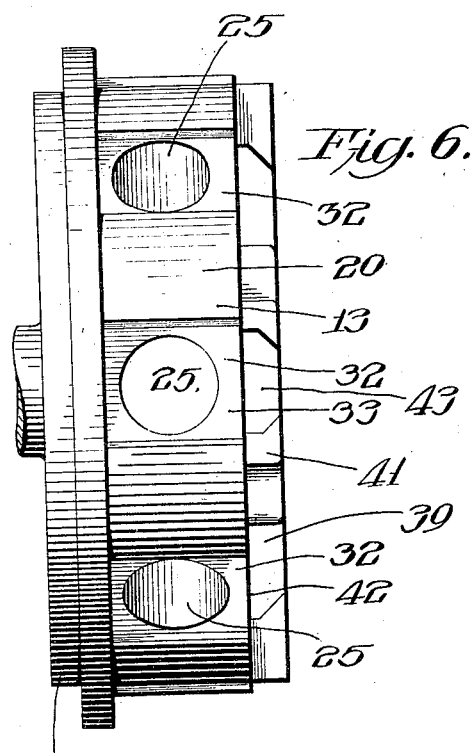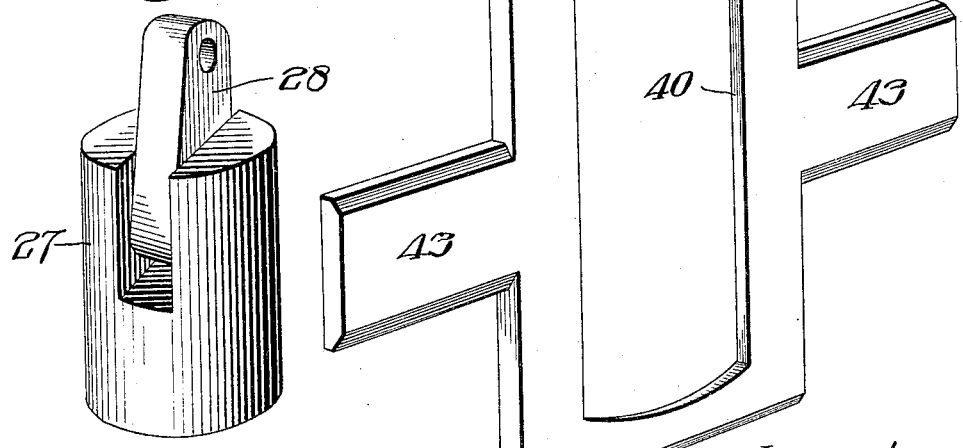

UNITED STATES PATENT OFFICE.

TIMOTHY WALSH, OF PHILADELPHIA, PENNSYLVANIA.

CLUTCH.

1,375,191.  Specification of Letters Patent.  Patented Apr. 19, 1921.

Application filed June 23, 1919. Serial No. 306,001.

*To all whom it may concern:*

Be it known that I, TIMOTHY WALSH, a citizen of the United States, residing at Philadelphia, in the county of Philadelphia and State of Pennsylvania, have invented certain new and useful Improvements in Clutches, of which the following is a specification.

One object of my invention is to provide an improved clutch which can be used practically for driving one shaft by power transmitted from another shaft and in which the direct clutching agent consists of liquid or other fluid compressed between the driving means and the driven means.

Another object is to so construct my improved clutch that there will be practically no friction exerted in the clutching action between the driving portion and the driven portion.

A further object is to make my improved clutch of a strong and durable construction and so that it can be easily operated.

These objects, and other advantageous ends which will be described hereinafter, I attain in the following manner, reference being had to the accompanying drawings in which—

Figure 5:
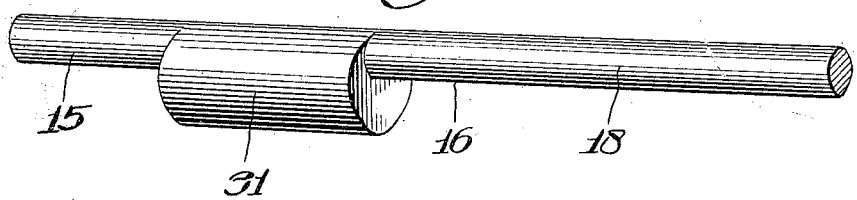

Fig. 5 is a perspective view of an eccentric shaft which forms a part of my invention, Fig. 6 is an edge elevation of a substantially cylindrical body portion which forms a part of my invention, Fig. 7 is a perspective view of a coupling ring which forms a part of my invention, Fig. 8 is a perspective view of a slidable frame which is operative in conjunction with the coupling ring shown in Fig. 7, and Fig. 9 is a perspective view of one of a number of fluid compressing plungers which forms a part of my invention.

Figure 1:
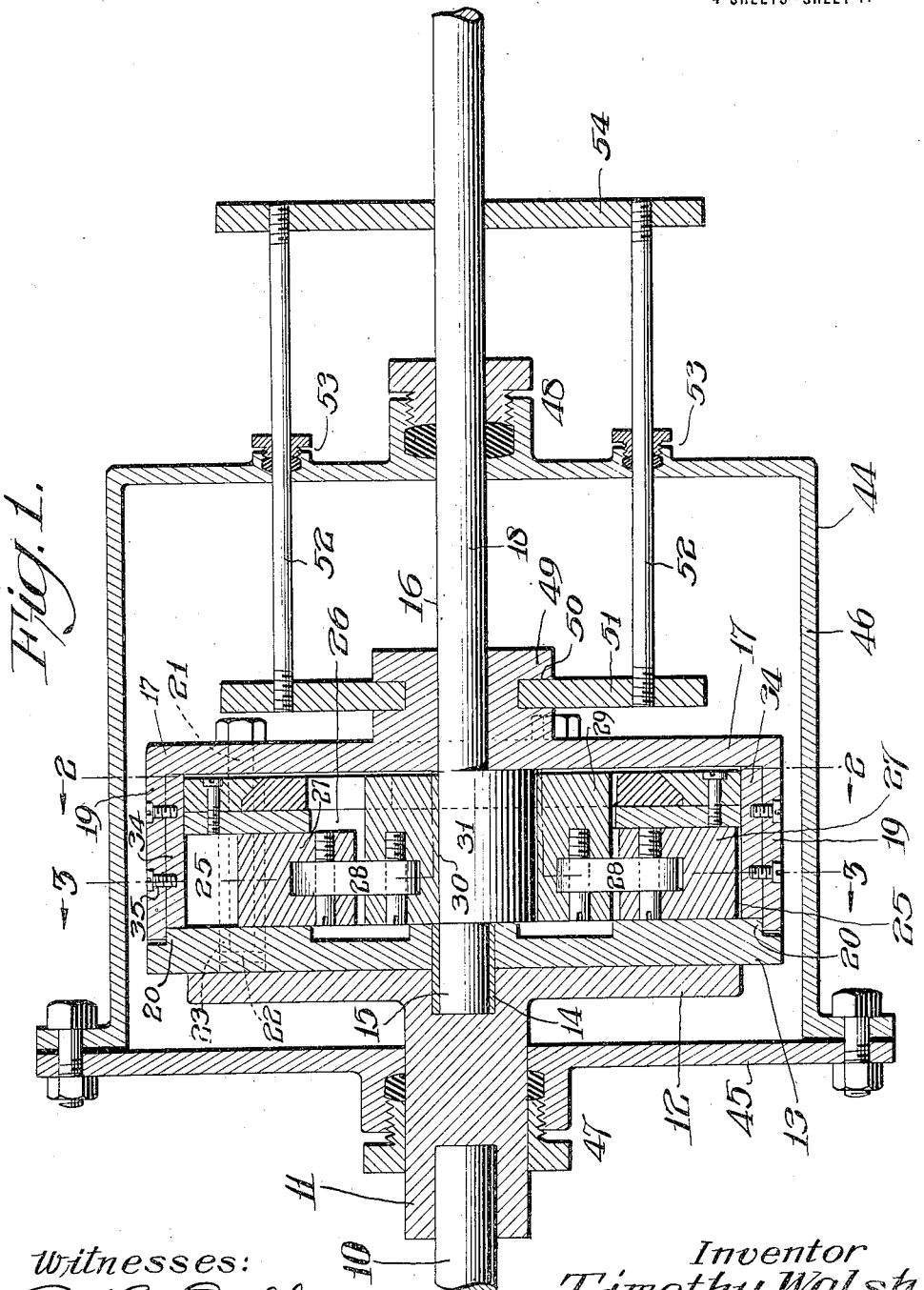
Figure 1 is a central sectional elevation of my invention.
Figure 3:
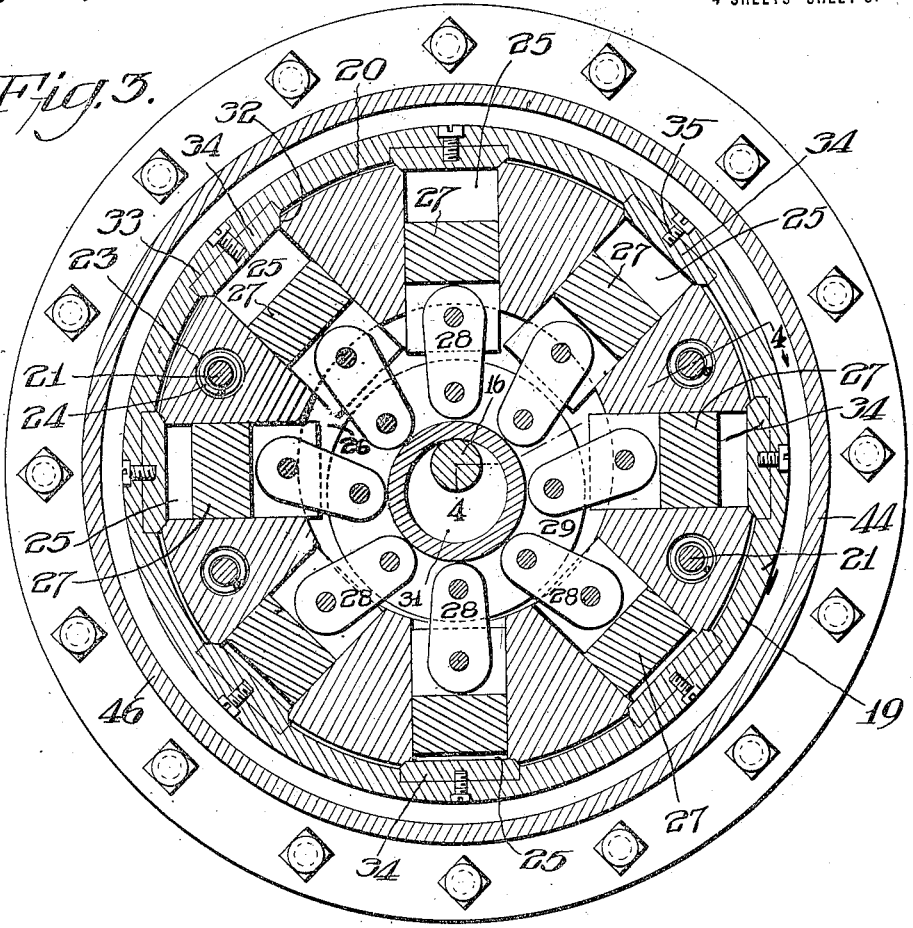
Fig. 3 is a transverse section taken on the line 3—3 of Fig. 1.
Figure 4:
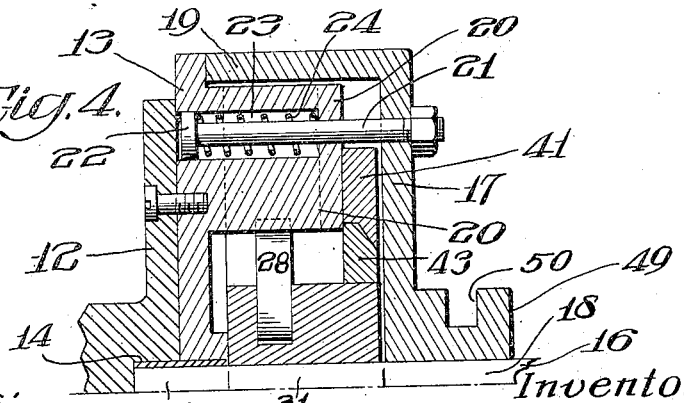
Fig. 4 is a fragmentary section taken on the line 4—4 of Fig. 3.

Referring to the drawings, 10 represents a shaft having a head 11 secured thereto, said head being provided with a flange 12 which is secured to a substantially cylindrical body portion 13, said body portion having a bushing 14 in which is journaled one end 15 of a shaft 16. A hollow flanged collar 17 is slidably mounted on the portion 18 of the shaft 16 and the peripheral flange 19 of the collar 17 is adapted to inclose the part 20 of the body portion 13, as clearly shown in Figs. 1, 3 and 4. The internal diameter of the flange 19 is greater than the external diameter of the part 20 so that there is no friction exerted by the inner surface of the flange 19 against the outer peripheral surface of the part 20. Bolts 21 extend through the collar 17 and have heads 22 which slidably fit bored chambers 23 in the body portion 13. Coiled springs 24 (see Figs. 3 and 4) are interposed between the heads 22 and the inner ends of said chambers so that said springs operate to move the collar 17 toward the body portion 13 so as to inclose the part 20.

The part 20 has a number of cylindrical chambers 25 which are bored radially inward from the peripheral surface of the part 20 and these chambers 25 extend into a cavity 26 formed centrally within said body portion 13. Plungers 27 slidably fit within the chambers 25 and are pivotally connected by links 28 with a coupling ring 29, said coupling ring having a central bore 30 into which fits an eccentric portion 31 of the shaft 16. The peripheral surface of the part 20 of the body portion 13 has recesses 32 cut therein; the inner surfaces 33 of said recesses being arranged in planes at right angles to the respective axes of the cylindrical chambers 25. The collar 17 has a number of filling pieces or pads 34 secured to the inner surface of the flange 19 by screws 35. These filling pieces or pads are adapted to respectively slide within the recesses 33, due to the action of the springs 24 so as to cover the outer ends of the chambers 25 when the collar is in its full inclosing position relative to the part 20 of the body portion 13.

Figure 2:
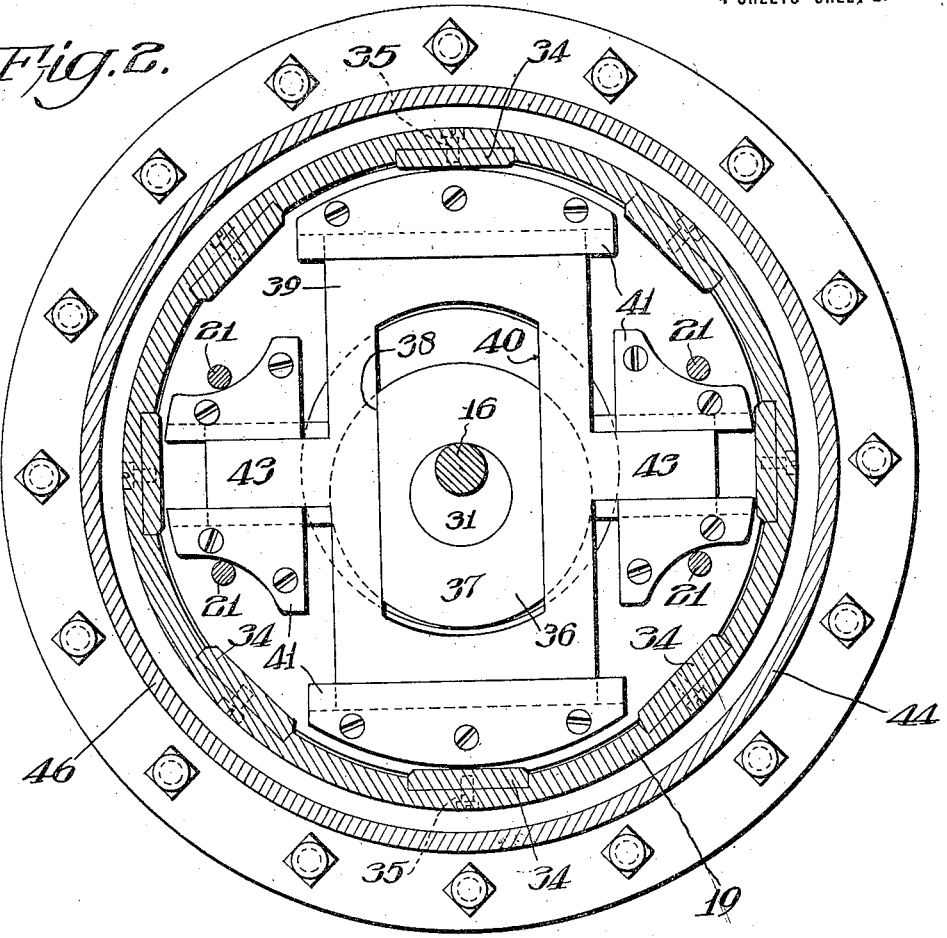
Fig. 2 is a transverse section taken on the line 2—2 of Fig. 1.

The outer portion of the ring 29 has a projection 36 providing an outer plane surface 37 and two straight edge surfaces 38. A frame 39 has a central slot 40 in which the projection 36 is adapted to slide, and guiding members 41 are secured to the outer face 42 of the part 20 of the body portion 13 to provide slideways for lateral extensions 43 on the frame 39, as clearly shown in Figs. 2, 7 and 8. Thus the ring 29 is supported and at the same time can move to permit the rotation of the shaft 16; the ring 29 taking the movement prescribed by the eccentric portion 31 of said shaft 16. By thus positioning the ring 29 and having all of the links 28 of the same size and coupling the plungers as clearly shown in Fig. 3, it will be noted that when the shaft 16 is rotated the plungers 27 will be reciprocated within their respective chambers and when certain of the plungers are being moved inwardly within their chambers, others of the plungers will be moving outwardly. The above mentioned elements are adapted to rotate within a casing 44 which, as illustrated, is made in two sections 45 and 46. This casing is filled with oil, and stuffing boxes 47 and 48 are provided to permit the head 11 and shaft 16 to extend therethrough without possibility of the oil leaking out of the casing.

It will be noted that if the collar 17 is pulled away from the body portion 13 in the direction of the length of the shaft 16 that the oil within the casing 44 will enter and fill the chambers 25 and that when the collar 17 is released the springs 24 will move the collar so that the filling pieces or pads 34 will cross and close the outer ends of the chambers 25. By providing the recess 33 with the flat surfaces 32, the filling pads will form a complete closure for the chambers 25 and when the shaft 16 is rotated the eccentric portion 31 will move the ring 29 to actuate the plungers 27. The oil or other fluid in the chambers 25 will be compressed against the filling pieces 34 and the resulting pressure of the oil or fluid will cause the body portion 13 and collar 17 to be rotated in conjunction and thereby drive the shaft 10.

For the purpose of moving the collar 17 away from the body portion 13, so that the filling pieces 34 will uncover the chambers 25, I provide the collar 17 with a hub 49 having an annular groove 50 in which is positioned a plate 51. Rods 52 connect with the plate 51 and pass out of the casing 44 through stuffing boxes 53. The rods 52, on the outside of the casing 44 are connected to a cross head 54 and this cross head can be actuated by a foot lever or other suitable means not illustrated.

A clutch of this type, when the collar 17 is permitted to be moved by the springs 24 will gradually increase in its clutching action, until the chambers 25 will be entirely closed by the filling pieces 34. If the filling pieces become worn they can be readily removed or can be "built out" so that there will always be a snug fit between the filling pieces and the recesses 33.

By making the part 20 of the body portion 13 of smaller diameter than the internal diameter of the flange 19, friction between the collar 17 and the body portion 13 will be reduced to a minimum so that it will require comparatively little power to withdraw the filling pieces 34 from over the chambers 25. It will be noted that the frame 39 freely slides between the guiding members, as clearly shown in Fig. 2, and the coupling ring 29 is free to slide within the slot 40. By this construction a free movement can be imparted to the coupling ring through the medium of the eccentric portion 31 of the shaft 16 and the plungers will smoothly operate within their chambers without any binding action.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A clutch of the character described including a body portion having chambers therein extending in the direction of their lengths toward a peripheral surface of said body portion; plungers operative within said chambers, said peripheral surface of the body portion having finished recesses therein respectively intercepting said chambers; and a flanged collar having finished portions adapted to slidably enter and closely fit said recesses to close the outer ends of said chambers; substantially as described.

2. A clutch of the character described including a substantially cylindrical body portion having chambers therein; a shaft having an eccentric portion; a ring fitting said eccentric portion; plungers operative within the chambers; means operatively connecting the plungers to said ring; recesses formed in the outer surface of said body portion and intercepting said chambers; and a flanged collar having portions finished and adapted to enter and closely fit said recesses and close the outer ends of said chambers; substantially as described.

3. A clutch of the character described including a substantially cylindrical body portion having chambers therein; a shaft having an eccentric portion; a ring fitting said eccentric portion; plungers operative within the chambers; means operatively connecting the plungers to said ring, said body portion having recesses in its outer surface intercepting the outer ends of said chambers; a collar having a flange of greater internal diameter than the external diameter of said body portion whereby said flange can embrace said body portion so that a space is provided between the outer surface of said body portion and the inner surface of said flange; and filling pieces projecting inwardly from said flange and adapted to slide within said recesses and thereby close the outer ends of said chambers; substantially as described.

4. A clutch of the character described including a substantially cylindrical body portion having chambers therein; a shaft having an eccentric portion; a ring fitting said eccentric portion; plungers operative within the chambers; means operatively connecting the plungers to said ring; a frame slidably mounted on said body portion and having a slot therein, said ring having a projection slidably fitting said slot; and a flanged collar adapted to embrace said body portion so as to close the outer ends of said chambers; substantially as described.

5. A clutch of the character described including a substantially cylindrical body portion having chambers therein; a shaft having an eccentric portion; a ring fitting said eccentric portion; plungers operative within the chambers; means operatively connecting the plungers to said ring; a flanged collar adapted to embrace said body portion so as to close the outer ends of said chambers, said body portion having other chambers therein; bolts connected to said collar and having heads movable in said latter chambers; and springs positioned within said latter chambers and operative upon the heads of said bolts, whereby the collar is moved into embracing position with the body portion; substantially as described.

In testimony whereof I have signed my name to this specification in the presence of two subscribing witnesses.

TIMOTHY WALSH.

Witnesses:
H. S. COONES,
CHAS. E. POTTS.